(12) United States Patent
Olgaard et al.

(10) Patent No.: US 8,774,729 B2
(45) Date of Patent: Jul. 8, 2014

(54) SYSTEM AND METHOD FOR SYNCHRONIZED TRIGGERING OF TEST EQUIPMENT FOR TESTING MIMO TRANSCEIVERS

(75) Inventors: Christian Volf Olgaard, Saratoga, CA (US); Ruizu Wang, San Ramon, CA (US); John Christopher Lukez, Morgan Hill, CA (US); Guang Shi, San Jose, CA (US)

(73) Assignee: Litepoint Corporation, Sunnyvale, CA (US)

( * ) Notice: Subject to any disclaimer, the term of this patent is extended or adjusted under 35 U.S.C. 154(b) by 253 days.

(21) Appl. No.: 13/462,141

(22) Filed: May 2, 2012

(65) Prior Publication Data

US 2013/0295858 A1    Nov. 7, 2013

(51) Int. Cl.
*H04B 17/00*    (2006.01)
(52) U.S. Cl.
USPC .............. 455/67.14; 455/67.11; 324/537; 324/756.05
(58) Field of Classification Search
CPC .............. H04W 24/00; H04B 17/0085; H04B 17/0024; H04B 17/002
USPC ............... 455/67.14, 67.11; 324/537, 756.05
See application file for complete search history.

(56) References Cited

U.S. PATENT DOCUMENTS

| | | | | |
|---|---|---|---|---|
| 7,822,130 B2* | 10/2010 | Walvis et al. | | 375/260 |
| 7,948,254 B2* | 5/2011 | Olgaard et al. | | 324/756.05 |
| 7,965,986 B2* | 6/2011 | Foegelle | | 455/67.11 |
| 8,326,229 B2* | 12/2012 | Foegelle | | 455/67.11 |
| 8,655,284 B2* | 2/2014 | Foegelle | | 455/67.11 |
| 2008/0056340 A1* | 3/2008 | Foegelle | | 375/224 |
| 2008/0305754 A1* | 12/2008 | Foegelle | | 455/115.1 |
| 2009/0251153 A1* | 10/2009 | Xie et al. | | 324/537 |
| 2010/0261431 A1* | 10/2010 | Olgaard | | 455/67.11 |
| 2011/0053516 A1* | 3/2011 | Harteneck | | 455/67.11 |

OTHER PUBLICATIONS

International Search Report Dated Jun. 26, 2013 for Application No. PCT /US2013/028830; 3 Pages.
Written Opinion Dated Jun. 26, 2013 for for Application No. PCT /US2013/028830; 4 Pages.
Walvis et al., "MIMO WLAN Test Methodologies for Manufacturing", RFDESIGN, Jun. 21, 2007; last retrieved at: http://rfdesign.com/microwave_millimeter_tech/test_and_measurement/mimo-wlan-test-methodologies-0607/.

* cited by examiner

*Primary Examiner* — April G Gonzales
(74) *Attorney, Agent, or Firm* — Vedder Price, P.C.

(57) ABSTRACT

A system and method for testing multiple-input-multiple-output (MIMO) devices under test (DUTs) with multiple radio frequency (RF) signal testers. Each tester receives one or more RF signals from one or more of the DUTs, and the testers are mutually coupled in a ring such that successive ones receive a trigger input signal from an upstream tester and provide a trigger output signal to a downstream tester. Each tester is responsive to its input trigger signal and its one or more RF signals by providing its output trigger signal such that its output trigger signal has an asserted state initiated in response to an assertion of its input trigger signal and a transcending of a predetermined magnitude by at least one of the one or more RF signals.

9 Claims, 2 Drawing Sheets

SYSTEM AND METHOD FOR SYNCHRONIZED TRIGGERING OF TEST EQUIPMENT FOR TESTING MIMO TRANSCEIVERS

TECHNICAL FIELD

The present invention relates generally to systems and methods for testing electronic equipment. More particularly, it relates to improvements in systems and methods for testing wireless signal transceivers using test platforms consisting of hardware, firmware and/or software components.

BACKGROUND

Many of today's handheld devices make use of wireless "connections" for telephony, digital data transfer, geographical positioning, and the like. Despite differences in frequency spectra, modulation methods, and spectral power densities, the wireless connectivity standards use synchronized data packets to transmit and receive data. In general, all of these wireless capabilities are defined by industry-approved standards (e.g. IEEE 802.11 and 3GPP LTE) which specify the parameters and limits to which devices having those capabilities must adhere.

At any point along the device-development continuum, it may be necessary to test and verify that a device is operating within its standards' specifications. Most such devices are transceivers, that is, they transmit and receive wireless RF signals. Specialized systems designed for testing such devices typically contain subsystems designed to receive and analyze device-transmitted signals (e.g., vector signal analyzers or VSAs) and to send signals (e.g., vector signal generators or VSGs) that subscribe to the industry-approved standards so as to determine whether a device is receiving and processing the wireless signals in accordance with its standard.

In testing wireless devices that employ multiple input/multiple output (MIMO) technology, the most accurate testing will simulate real-world environments. Thus, if a MIMO device has two antennas, two transmitters and two receivers (e.g., a 2×2 MIMO device), the most accurate testing would involve doing receive signal (RX) testing using two VSGs and transmit signal (TX) testing using two VSAs, plus some means of synchronizing the VSA and VSG operations.

When such single VSA/VSG testers are used to test TX functions of a device under test (DUT), the TX signals are sampled one at a time by the VSA using a multiplexing or switching scheme. Thus, one is unable to fully simulate the environment where multiple TX signals are transmitted simultaneously.

One can, in fact, simulate real-world environments using testers equipped with multiple VSAs and VSGs, and synchronization. And, it could be possible to build up such a test capability by using two or more single VSA/VSG testers to create a N×N MIMO test capability (where N≥2). However, the concatenation of such testers is not trivial. There are triggering issues that must be resolved in order to have the combination simulate real-world MIMO conditions. For example, each tester must have the ability to trigger the others as the DUT may not use all transmitters it has available.

Therefore, a system and method designed to support routine concatenation of single VSA/VSG test systems which provides an expandable triggering capability would provide a faster, simpler means for combining such testers while offering more accurate simulation of real-world MIMO environments and conditions. Furthermore, since MIMO is not limited to 4×4, having dedicated trigger lines for each tester is less desirable than have a scalable solution that permits one to add new testers as the N-level of N×N MIMO increases.

SUMMARY

A system and method for testing multiple-input-multiple-output (MIMO) devices under test (DUTs) with multiple radio frequency (RF) signal testers. Each tester receives one or more RF signals from one or more of the DUTs, and the testers are mutually coupled in a ring such that successive ones receive a trigger input signal from an upstream tester and provide a trigger output signal to a downstream tester. Each tester is responsive to its input trigger signal and its one or more RF signals by providing its output trigger signal such that its output trigger signal has an asserted state initiated in response to an assertion of its input trigger signal and a transcending of a predetermined magnitude by at least one of the one or more RF signals.

DETAILED DESCRIPTION

Figure 1:
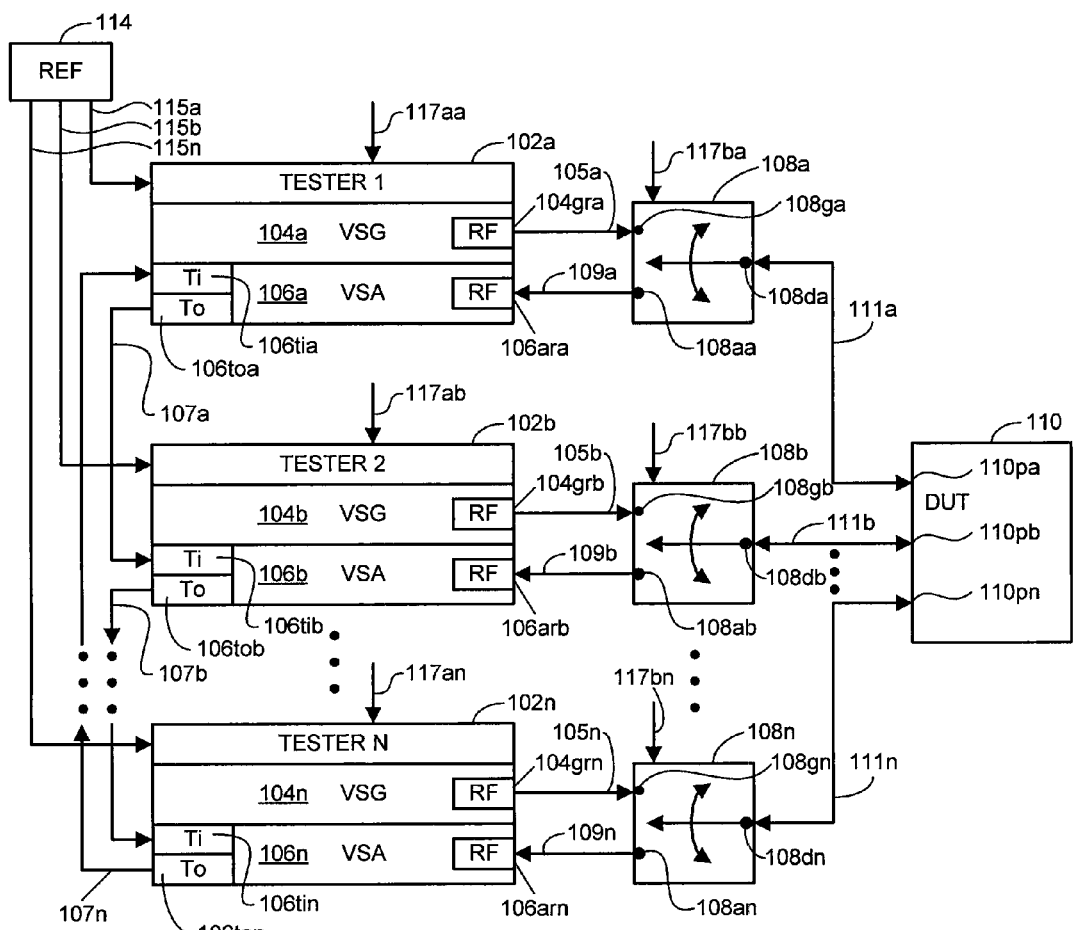
FIG. 1 is a functional block diagram of a system for testing MIMO signal transceivers with multiple RF signal testers in accordance with one embodiment of the presently claimed invention.

The invention will now be described with reference to the drawing figures, in which like reference numerals refer to like elements throughout. The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that the term "signal" may refer to one or more currents, one or more voltages, or a data signal.

Referring to FIG. 1, a system 100 for testing multiple MIMO devices with multiple RF signal testers includes signal testers 102 (e.g., N signal testers 102a, 102b, . . . , 102n) and a corresponding number of signal routing circuits or devices 108 (e.g., signal switches having a pole 108d and a throw 108g, 108a for each RF signal) for coupling via RF signal cables 111 to the N signal ports 110p of the DUT 110. As discussed in more detail below, a reference signal source 114 can also be included for provided reference signals 115 for the testers 102 (e.g., for frequency synchronization within and among the testers 102).

As is well known in the art, each tester 102 typically includes a signal source in the form of a vector signal generator (VSG) 104 and a signal analyzer in the form of a vector signal analyzer (VSA) 106, both of which are controlled by internal control circuitry (not shown) and often by external control signals 117a provided by an external controller, such as a personal computer (not shown). Similarly, switch control signals 117b are provided to the signal switches 108 so as to route signals 105 from the VSGs 104 to the DUT 110 and signals from the DUT 110 to the VSAs 106, as appropriate for the test sequences. These control signals can also be provided by an external controller, or, alternatively, by control circuitry (not shown) within the testers 102.

The testers 102 also include RF signal ports 104gr, 106ar via which VSG signals 105 are provided and incoming DUT signals 109 for the VSAs 106 are received. The VSAs 106 also include trigger signal input ports 106ti and trigger signal output ports 106to (discussed in more detail below). The first VSA 106a receives its trigger input signal 107n from the last VSA 106n and provides its trigger output signal 107a to the next downstream VSA 106b. At the other end, the last tester 102n receives its trigger input signal from the last upstream tester and provides its output trigger signal 107n back to the first tester 102a. Accordingly, the trigger signals 107 are connected in a form of continuous loop from upstream to downstream testers and back again.

The reference signals 115 provided by the reference signal source 114 (e.g., a temperature compensated crystal oscillator) provide a common frequency/timing reference and global synchronization for the testers 102. When receiving an input signal 109 originating from one of the signal ports 110p of the DUT 110, a trigger output signal 107 is generated by that tester 102 for use as a trigger input signal for its neighboring downstream tester 102, as discussed above. As a result, the detection of a DUT signal 109 by the VSA 106 of an individual tester 102 will initiate a trigger signal that will be propagated through the trigger signal loop among all testers 102. This trigger signal prompts each VSA 106 to capture any DUT signal 109 present at its RF input signal port 106ar. Accordingly, depending upon which tester receives its DUT signal 109 first, any of the concatenated testers 102 can act as the VSA trigger master initiating a triggered response among all testers 102.

As will be readily appreciated, this continuous loop of trigger signal connections can be scaled for an arbitrary number of testers 102. Further, while an exemplary embodiment involves initiation of this trigger signal by detection of the rising edge of an incoming RF signal 109 (e.g., when a signal power detector indicates the transcending of the input signal magnitude beyond a predetermined magnitude threshold) the initial trigger for the trigger signal loop can be initiated in other ways, such as by a free running trigger signal initiated by software within a tester 102, by a downlink as in the case of a WCDMA, CDMA, EVDO or LTE system, or in accordance with the externally generated control signals 117a.

Figure 2:
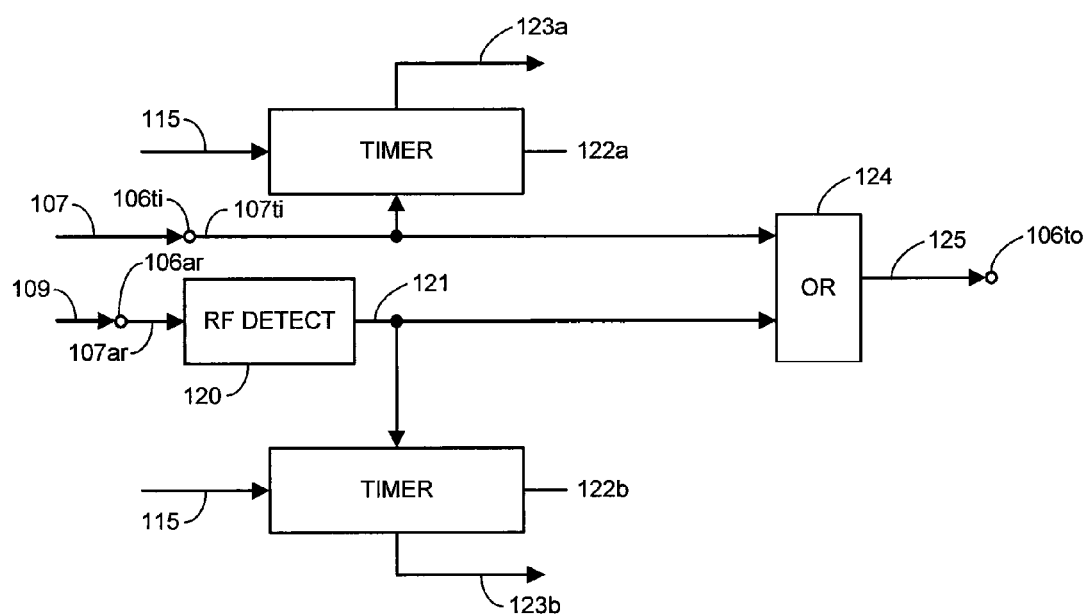
FIG. 2 is a functional block diagram of trigger signal circuitry for providing synchronized trigger signals used in the system of FIG. 1 in accordance with one embodiment of the presently claimed invention.

Referring to FIG. 2, in accordance with an exemplary embodiment, trigger signal circuitry for generating the trigger output signal to be made available at the trigger signal output port 106to includes RF signal detection circuitry 120 and signal combining (e.g., "OR") circuitry 124, as well as timing circuitry 122. The incoming RF signal 109 received via the RF signal input signal port 106ar serves as a received RF signal 107ar for detection by the RF signal detection circuitry 120. The resulting detection signal 121 (e.g., indicative of a signal voltage magnitude or signal power level of the input signal 107ar) is provided to the combining circuit 124 and a timing circuit 122b. Similarly, the loop trigger signal 107, received via the trigger signal input port 106ti, serves as the internal trigger input signal 107ti that is provided to the signal combining circuit 124 and another timing circuit 122a.

In accordance with a preferred embodiment, the combining circuit 124 provides a trigger output signal 125 that is initiated in response to the first assertion of the two input signals 107ti, 121, thereby initiating the synchronized triggering of the testers 102 as discussed above.

The timing circuits 122 compare these internal trigger signals 107ti, 121 with the external reference signal 115 to provide timing signals 123 that can be used for post-processing compensation of the captured RF signals 109 performed by the VSAs 106. For example, the timing circuits 122 can provide a capability for comparing the two trigger signals 107ti, 121 against the reference signal 115 to determine relative timing differences against that common reference signal 115. This will allow post-processing compensation of the data captures in order to properly align the events in time during the data analysis that follows. For example, the timing signals 123 can provide a reference point in time for compensation of the placement of the captured data signal in the time domain. In other words, after the results have been captured, due to delays around the loop, the relative starting point of the captured signal, in time, may need to be compensated so that its juxtaposition vis-à-vis concurrent MIMO signals is accurate. Without such compensation, the loop would provide triggering but the concurrent capture points in the time domain may be skewed.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A system including a plurality of radio frequency (RF) signal testers for testing a plurality of multiple-input-multiple-output (MIMO) devices under test (DUTs), comprising:
   a first RF signal tester as one of one or more downstream RF signal testers; and
   a last RF signal tester as one of one or more upstream RF signal testers;
   wherein each one of said plurality of RF signal testers includes:
   one or more RF signal ports for receiving one or more RF signals from one or more of said plurality of DUTs;
   a trigger input port for receiving an input trigger signal from one of
     one of said one or more upstream RF signal testers and said last RF signal tester;
   a trigger output port for providing an output trigger signal for one of
     one of said one or more downstream RF signal testers and
     said first RF signal tester; and
   trigger signal circuitry coupled between at least one of said one or more RF signal ports, said trigger input port and said trigger output port, and responsive to said input trigger signal and said one or more RF signals by providing said output trigger signal and at least one timing signal temporally related to said output trigger signal, wherein said output trigger signal has an asserted state initiated in response to an assertion of at least one of said input trigger signal, and
     a transcending of a predetermined magnitude by at least one of said one or more RF signals.

2. The system of claim 1, wherein said trigger signal circuitry comprises:

signal detection circuitry responsive to at least one of said one or more RF signals by providing a detection signal following said transcending of a predetermined magnitude by said at least one of said one or more RF signals; and signal combining circuitry coupled to said signal detection circuitry and responsive to at least one of said input trigger signal and said detection signal by providing said output trigger signal.

3. The system of claim 1, wherein each one of said plurality of RF signal testers further includes a reference signal port for receiving a reference signal.

4. The system of claim 3, wherein said trigger signal circuitry comprises:

signal detection circuitry responsive to at least one of said one or more RF signals by providing a detection signal following said transcending of a predetermined magnitude by said at least one of said one or more RF signals;

signal combining circuitry coupled to said signal detection circuitry and responsive to at least one of said input trigger signal and said detection signal by providing said output trigger signal; and timing circuitry coupled to said reference signal port, said trigger input port and said signal detection circuitry, and responsive to said reference signal, said input trigger signal and said detection signal by providing said at least one timing signal, wherein said at least one timing signal is further temporally related to at least one of said reference signal, said input trigger signal and said detection signal.

5. The system of claim 1, wherein each one of said plurality of RF signal testers further includes a vector signal analyzer (VSA) and a vector signal generator (VSG).

6. A method of testing a plurality of multiple-input-multiple-output (MIMO) devices under test (DUTs) with a plurality of radio frequency (RF) signal testers, comprising:

providing said plurality of RF signal testers including
a first RF signal tester as one of one or more downstream RF signal testers, and
a last RF signal tester as one of one or more upstream RF signal testers;

receiving, with each one of said plurality of RF signal testers, one or more RF signals from one or more of said plurality of DUTs;

receiving, with each one of said plurality of RF signal testers, an input trigger signal from one of
one of said one or more upstream RF signal testers and said last RF signal tester;

providing, with each one of said plurality of RF signal testers, an output trigger signal for one of
one of said one or more downstream RF signal testers and
said first RF signal tester; and responding, with each one of said plurality of RF signal testers, to said input trigger signal and said one or more RF signals by providing said output trigger signal and at least one timing signal temporally related to said output trigger signal, wherein said output trigger signal has an asserted state initiated in response to an assertion of at least one of
said input trigger signal, and
a transcending of a predetermined magnitude by at least one of said one or more RF signals.

7. The method of claim 6, wherein said responding, with each one of said plurality of RF signal testers, to said input trigger signal and said one or more RF signals by providing said output trigger signal comprises:

responding, with each one of said plurality of RF signal testers, to at least one of said one or more RF signals by providing a detection signal following said transcending of a predetermined magnitude by said at least one of said one or more RF signals; and responding, with each one of said plurality of RF signal testers, to at least one of said input trigger signal and said detection signal by providing said output trigger signal.

8. The method of claim 6, further comprising receiving, with each one of said plurality of RF signal testers, a reference signal.

9. The method of claim 8, wherein said responding, with each one of said plurality of RF signal testers, to said input trigger signal and said one or more RF signals by providing said output trigger signal comprises:

responding, with each one of said plurality of RF signal testers, to at least one of said one or more RF signals by providing a detection signal following said transcending of a predetermined magnitude by said at least one of said one or more RF signals;

responding, with each one of said plurality of RF signal testers, to at least one of said input trigger signal and said detection signal by providing said output trigger signal; and responding, with each one of said plurality of RF signal testers, to said reference signal, said input trigger signal and said detection signal by providing said at least one timing signal, wherein said at least one timing signal is further temporally related to at least one of said reference signal, said input trigger signal and said detection signal.

\* \* \* \* \*